(12) United States Patent
Rudmann et al.

(10) Patent No.: US 7,704,418 B2
(45) Date of Patent: *Apr. 27, 2010

(54) MANUFACTURING OPTICAL ELEMENTS (75) Inventors: Harmut Rudmann, Unterlunkhofen (CH); Stephan Heimgartner, Luzern (CH); Susanne Westenhöfer, Wettswil (CH); Markus Rossi, Jona (CH)

(73) Assignee: Heptagon Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 11/943,443

(22) Filed: Nov. 20, 2007

(65) Prior Publication Data

US 2008/0054506 A1 Mar. 6, 2008

Related U.S. Application Data (63) Continuation-in-part of application No. 11/384,562, filed on Mar. 20, 2006.

(51) Int. Cl.
B29D 11/00 (2006.01)

(52) U.S. Cl. .................. 264/2.2; 264/2.7; 425/808

(58) Field of Classification Search .................. 264/1.1, 264/2.2, 2.3, 2.4, 2.7; 425/808
See application file for complete search history.

(56) References Cited

U.S. PATENT DOCUMENTS 5,271,875 A 12/1993 Appleton et al.
7,094,304 B2 8/2006 Nystrom et al.
2004/0040648 A1* 3/2004 Harden et al. ............... 156/242

FOREIGN PATENT DOCUMENTS

EP 1443344 * 8/2004

OTHER PUBLICATIONS

U.S. Appl. No. 11/384,562, filed Mar. 20, 2006, Rudmann et al.
U.S. Appl. No. 11/384,537, filed Mar. 20, 2006, Rudmann et al.
U.S. Appl. No. 11/384,563, filed Mar. 20, 2006, Rudmann et al.
U.S. Appl. No. 11/384,558, filed Mar. 20, 2006, Rudmann et al.
U.S. Appl. No. 11/943,472, filed Nov. 19, 2007, Rudmann et al.
U.S. Appl. No. 11/943,476, filed Nov. 19, 2007, Rudmann et al.

* cited by examiner

*Primary Examiner*—Mathieu D. Vargot
(74) *Attorney, Agent, or Firm*—Proskauer Rose LLP (57) ABSTRACT

An optical element is manufactured using a replication tool comprising a negative structural feature defined in a replication side of the replication tool, and a peripheral feature formed in the replication side of the replication tool adjacent the negative structural feature. The negative structural feature defines the shape of the optical element. A replication material is disposed between a substrate and the replication tool, which are moved toward each other. The peripheral feature confines the replication material to a predetermined area of the substrate. The replication material can be hardened to form the optical element from the replication material attached to the substrate.

13 Claims, 6 Drawing Sheets

MANUFACTURING OPTICAL ELEMENTS

CROSS-REFERENCE TO RELATED APPLICATION

This application is a continuation-in-part of U.S. patent application Ser. No. 11/384,562, filed Mar. 20, 2006, the disclosure of which is herein incorporated by reference in its entirety.

FIELD OF THE INVENTION

The invention is in the field of manufacturing miniature optical or mechanical elements, in particular refractive optical elements or diffractive micro-optical elements, by means of a replication process that includes embossing or moulding steps.

BACKGROUND OF THE INVENTION

Replicated optical elements include refractive elements such as lenses and diffractive and/or refractive micro-optical elements for influencing an optical beam in a pre-defined manner.

When optical elements are produced by replication, there is often a basic configuration involving a substrate and replication material on a surface thereof. The replication material can be shaped and hardened in the course of a replication process. Often, the dimension perpendicular to the named substrate surface—the thickness or height of the replicated structures, also termed z-dimension—is important and is well-defined and controlled. Since the other dimensions of the element are defined by the replication tool—this being the nature of the replication process—also the volume of the replicated element is well defined. However, small volumes of dispensed liquid or viscous material are generally difficult and costly to control. Since elements that are only partially filled are defective and lost, it is therefore advantageous to dispense excess replication material. By this, one makes sure that also for replication material volumes that fluctuate between different elements, no or only few elements are lost.

Of special interest are the wafer-scale fabrication processes, where an array of optical elements is fabricated on a disk-like ("wafer-") structure, which subsequent to replication is separated ("diced") into the individual elements or stacked on other wafer-like elements and after stacking separated into the individual elements. Wafer scale refers to the size of disk like or plate like substrates of sizes comparable to semiconductor wafers, such as disks having diameters between 2 in and 12 in. In conventional wafer-scale replication processes, replication material for the entire, wafer-scale replica is disposed on the substrate in a single blob. However, there might be areas sideward of the element where replication material is not wanted in later replication steps. In certain applications, the fabricated elements must for example be used in combination with other elements, and the residual material will impair the function of the combined structure.

In such an array replication process, excess material can ooze out sideward from the element volume. For example, miniature optical lenses can be replicated above the surface of a wafer carrying semiconductor chips each embodying a CCD or CMOS-camera sensor array. The residual material, if it covers critical areas, can interfere with further processing steps of the stack comprising the semiconductor wafer and the lenses, e.g., bonding.

A structured (or micro-structured) element can be manufactured by replicating/shaping (moulding or embossing or the like) a 3D-structure in a preliminary product using a replication tool. The replication tool comprises a spacer portion protruding from a replication surface. A replicated micro-optical element is referred to as replica.

The spacer portions can allow for an automated and accurate thickness control of the deformable material on the substrate. They can include "leg like" structures built into the tool. In addition, the spacers can prevent the deformation of the micro optical topography since the spacers protrude further than the highest structural features on a tool.

The spacer portion is preferably available in a manner that it is distributed over at least a portion of the replication tool, for example, over the entire replication tool or at the edge. This means that features of the spacer portion are present in an essential fraction of the replication tool, for example, the spacer portion includes a plurality of spacers distributed over the replication surface of the replication tool. The spacers can allow for an automated and accurate thickness control of the replication material layer.

The replication process can be an embossing process, where the plastically deformable or viscous or liquid replication material for the product to be shaped is placed on a surface of a substrate, which can have any size. In the embossing step, the spacer portions abut against the top surface of the substrate. The surface thus serves as a stop face for the embossing, which can control the thickness (height, z-dimension) of the replicated elements. Other ways of controlling the z-dimension include measuring the distance between a tool plane and a substrate plane, and actively adjusting this distance at different places by a robot. The embossing step and/or the spacer portion, however, can cause residual material to remain in the areas between the elements, and for example, also around the periphery of each of the elements.

SUMMARY OF THE INVENTION

The invention, in one embodiment, features a method of replicating an optical element and a replication tool for forming the optical element. The replication material can be confined between the tool and the surface of the substrate. By confining the replication material to only part of the substrate surface, the resulting element can, after hardening, by e.g., curing, cover part of the substrate. The element need not extend to cover the substrate in predetermined areas, leaving them free for bonding.

The replication tool can include one or more sections, each defining a negative structural feature that defines the shape of a component (such as an optical element or a lens). The sections can be separated from the other sections by dicing the substrate or an assembly including the substrate, to form individual elements. The confining of replication material to a predetermined area of the substrate can include confining the replication material to a plurality of regions, each region around a replication section, the regions preferably not overlapping. For example, the replication sections can be present as an array of identical replication sections, where around each of the replication sections the replication material is confined to a region.

In one aspect, the invention features a method of manufacturing an optical element. The method uses a replication tool including a negative structural feature defined in a replication side of the replication tool and a peripheral feature formed in the replication side of the replication tool adjacent the negative structural feature. The negative structural feature defines the shape of the optical element. A replication material is disposed between a substrate and the replication tool, which are moved toward each other. The peripheral feature confines the replication material to a predetermined area of the substrate. The replication material is hardened to form the optical element from the replication material attached to the substrate.

In another aspect, the invention features a replication tool for replicating an optical element from a replication material. The replication tool includes a replication side and a negative structural feature defined in the replication side. The negative structural feature defines the shape of the optical element. The replication tool also includes a ridge formed in the replication side adjacent the negative structural feature and a recess defined in the replication side adjacent the ridge. An edge of the ridge confines an outward flow of the replication material to a predetermined area of the replication tool, when the replication tool is pressed against a substrate.

In yet another aspect, the invention features a replication tool for forming an optical element. The replication tool includes a replication side and a negative structural feature defined in the replication side. The negative structural feature defines the shape of the optical element. The replication tool also includes means for confining an outward flow of the replication material to a predetermined area of the replication tool when the replication tool is pressed against a substrate forming the optical element attached to the substrate. In some embodiments, the means for confining the outward flow of the replication material does so by at least one of capillary force and surface tension acting at the means.

In other examples, any of the aspects above, or any apparatus or method described herein, can include one or more of the following features. The replication material can be in at least one of a plastically deformable, viscous, or liquid state. Each optical element can be a refractive lens. The substrate can be optically transparent.

In certain embodiments, the predetermined area exceeds the desired area of the optical element on the substrate, in at least one direction along the surface of the substrate by less than the predetermined distance. The flow of the replication material can be controlled, while moving the replication tool against the substrate, by at least one of capillary forces and surface tension acting at the peripheral feature of the replication tool. An edge of the peripheral feature can control the flow.

In some embodiments, a pre-determined volume of the replication material can be applied to the substrate, and the flow of the replication material can be controlled, while moving the replication tool against the substrate, by at least one of capillary forces and surface tension acting at the peripheral feature of the replication tool.

The peripheral feature can include a ridge formed in the replication tool adjacent the negative structural feature. In certain embodiments, a dimension of the peripheral feature can be predetermined in accordance with a selected volume of the replication material to be applied.

In some embodiments, the negative structural feature is limited, at least in one lateral direction, by a flat section, an inner edge being formed between the negative structural feature and the flat section. The replication side of the replication tool can include at least one overflow volume. An outer edge can be formed between the flat section and the overflow volume, and the volume of the replication material can be larger than the volume of the negative structural feature so that the outer edge acts as the edge confining the replication material. The flat section can be asymmetrical with respect to a central axis of the negative structural feature.

The replication tool can define a plurality of negative structural features, each defining the shape of one optical element of a plurality of optical elements. In some embodiment, the replication tool is removed after the replication material is hardened, and the substrate is separated into discrete sections. The substrate can be separated along dicing lines defined by lateral positions of the substrate free of any replication material.

The peripheral feature can include a plurality of step features defined in the tool. At least one of the step features can confine the replication material to the predetermined area of the substrate.

The replication tool can include an overflow channel enabling flow of the replication material away from a central portion of the negative structural feature. In some embodiments, an edge of the ridge of the replication tool is adapted to selectively control flow of the replication material by at least one of capillary force and surface tension acting at the edge.

The replication tool can include a spacer portion. In such a tool, at least one cavity of the tool defines a replication surface with negative structural features, being a negative of at least some of the structural features of the element to be produced. The cavity contains the element volume and can additionally comprise at least one buffer and/or overflow volume. The spacer or spacer portions protrude from the replication surface. In the replication process, the spacer or spacer portions abut against the substrate and/or float on a thin basis layer of replication material.

The force by which the tool and the substrate are pressed against each other can be chosen based on specific requirements. For example, the force can be just the weight of the replication tool lying, by way of spacer portions abutting the substrate surface and/or floating on a thin basis layer of replication material, on the substrate. Alternatively, the substrate can lie on the replication tool. The force can, according to yet another alternative, be higher or lower than the weight and can for example be applied by a mask aligner or similar device, which controls the distance of the substrate and the replication tool during the replication process.

Before the replication tool and the substrate are brought together for the replication process, replication material in a liquid or viscous or plastically deformable state is placed on the replication tool and/or the substrate. The replication tool can, as mentioned above, can include a plurality of sections each defining an element to be replicated. Then, a preselected volume of replication material is applied locally and individually, at laterally displaced positions, each position corresponding to one section, to at least one of the tool and the substrate prior to pressing the tool against the substrate. This allows providing a plurality of cavities, each corresponding to an optical element, with an optimal amount of replication material. By this, the volume of surplus replication material that is removed or diverted from the critical areas is reduced or eliminated, as compared to the case where a plurality of elements would be formed from a single blob of replication material.

While the replication tool and the substrate are in the replication position—in which the replication tool and the substrate are brought together, for example the replication tool is placed on the substrate—the replication material is hardened. Depending on the replication material chosen, it can be hardened by curing, e.g., UV curing. As an alternative, it can be hardened by cooling. Depending on the replication material chosen, other hardening methods are possible. Subsequently, the replication tool and the replication material can be separated from each other. For most applications, the replication material remains on the substrate. The optical element typically is a refractive or diffractive optical element, but also can have a micromechanical function.

The element volume covers a part of the substrate and constitutes the functional part of the element. The remainder of the cured replication material can fill a volume at the sides of the element, i.e., the region of space adjacent to both the substrate and the functional part of the element, and does not interfere with the function of the element. How far the replication material can move along the substrate can be controlled at each side of the element volume.

In some embodiments, the flow of the replication material is controlled and/or limited by capillary forces and/or surface tension. This exploits the property of geometric features to further or to hinder the flow of the replication material between the tool and the substrate.

As an example, the replication tool can be chosen to comprise a plurality of cavities each defining the shape of one element or a group of elements, each cavity being limited, at least in one lateral direction, by a flat section. An inner edge is formed between the cavity and the flat section. The replication tool further comprises a plurality of overflow volumes or one contiguous overflow volume between the cavities. And an outer edge is formed between the flat section and the overflow volume. The dispensed replication material (per cavity) is chosen to be larger than the volume of the cavity. The flat section then serves as floating (non-contact) spacer, which preferably surrounds the cavity. The outer edge constitutes a discontinuity stopping a flow the replication material. Without such discontinuities, capillary forces would cause the replication material to eventually drain the replication material from the element volume.

The cavity, in this example, can include, for example, the element volume only. It can be dome-shaped so that the element is a convex refractive lens adjacent to which a thin base layer is formed, the base layer being what replication material remains underneath the floating spacer.

Even in the case of a cylinder symmetric optical element, the shape of the flat section, when seen in the direction perpendicular to the substrate surface, e.g. along a central axis of the element, can be asymmetrical so that a bulge of replication material forming along the outer edge in the overflow volume is farther away from the replication element towards one side of the element than towards an other side.

Here and in the following, for the sake of convenience, the dimension perpendicular to the surface of the substrate, which comprises an essentially flat surface, is denoted as height. In actual practice, the entire arrangement can also be used in an upside down configuration or also in a configuration where the substrate surface is vertical or at an angle to the horizontal. The according direction perpendicular to the surface is denoted z-direction. The terms periphery, lateral and sides typically relate to a direction perpendicular to the z-direction.

In another example, control of the flow is done by a cavity in the tool defining the shape of the element, and the cavity including a buffer volume along at least one side of the element, which buffer volume is separated from the element volume by an inner edge. Furthermore, the predetermined volume of replication material applied individually to the element volume of the cavity is smaller than the volume of the cavity. This causes the inner edge to limit the flow of the replication material into the buffer volume by capillary forces acting at the inner edge and by surface tension.

The predetermined volume of replication material can be about the volume of the element volume (or slightly smaller or slightly larger). The element volume is the volume of the functional element, extending from the outer shape of the element defined by the tool on one side to the substrate on the other side. The replication material can be stopped by fluid forces acting at the inner edge from flowing into the buffer volume.

In certain embodiments, when pressing the tool against the substrate, an inclined spacer displaces the replication material towards the element volume, and in particular a buffer volume adjacent to the element volume. The inclined spacer has an inclined surface that is to be brought into contact with the surface of the substrate. The inclined surface, when no pressure is applied, touches the substrate at an outer periphery, and in regions closer to the element volume, gradually moves away from the substrate. When, during embossing or moulding, pressure is applied to the tool, the tool, being slightly elastic, is deformed, and the inclined surface causes replication material to be displaced from under the inclined spacer.

In certain embodiments, the flow of the replication material can be confined toward at least one side of the tool by a contact spacer that touches the substrate. The flow of the replication material can be enabled toward another side of the tool by an overflow channel. This can allow diverting the replication material away from the critical areas and guiding it to an overflow volume located in a noncritical area.

The replication tool can include at least one spacer portion, protruding, on the replication side, from the cavities. The replication tool can include means for confining the replication material to a predetermined area of the tool, when the tool is pressed against a substrate, which predetermined area exceeds the desired volume of the element in at least one direction along the surface of the substrate by less than a predetermined distance.

Such means for confining the replication material, or flow confining features are constituted by the inner edge, the buffer volume, the outer edge, the spacer and the inclined spacer; each of them alone, or several of them in combination. They can be combined to form a multi-tiered flow confinement, which, according to the amount of replication material actually present, stops the flow at an earlier or a later limit. This allows controlling the flow despite inaccuracies when dispensing the replication material to individual cavities or onto corresponding individual locations on the substrate.

The cavity can include an element volume and a further volume, at a periphery of the element volume, the boundaries of the further volume comprising discontinuities for selectively inhibiting and/or enabling capillary flow of the replication material when pressing the tool against the substrate, with the replication material in between.

The discontinuities can be for circular optical elements, also circular in shape and concentric. For other shapes of optical elements, e.g. rectangles or rounded rectangles, the consecutive discontinuities can follow the shape of the optical element at increasing distances.

The discontinuity can be a ridge or a recess. In some embodiments, the discontinuity lies between ridges and recesses formed in the replication tool. Thus, the discontinuities can be the edge between circular or rectangular ridges and/or channels formed around the section of the replication tool that defines the optical element. A series of consecutive ridges and channels can, therefore, define a quantisation of the extension of the surplus replication material, since the outward flow of the replication material is inhibited or stopped at each edge or discontinuity, and continues only if the volume of the replication material in relation to the volume of the element volume exceeds a certain limit.

To minimize the area surrounding the optical element that remains covered by nonfunctional replication material, a floating spacer surrounding the element volume and defining its outer border is, for example, made as thin as possible while still providing the function of a spacer, e.g., providing sufficient support for the tool. Furthermore, the recess or several recesses outside the floating spacer, or outside the outer edge of the element volume (when there is no floating spacer), is preferably made as deep as possible, e.g. up to the depth of the element volume. In consequence, the volume defined by the recess is increased, and the volume of replication material it can absorb before the material spills over into the next recess is also increased.

The volume of each circumferential recess or channel is preferably correlated with the precision with which the volume of the replication material deposited dropwise can be controlled. For example, if the latter volume can be controlled to a high degree, then it is known that the size or volume of the surplus material varies within narrow bounds. In consequence, a recess is preferable located and sized such as to cover this variation in surplus size or volume. That is, with the minimum expected surplus size, according to the deposition accuracy, the recess is not filled, and for the maximum surplus size, the recess is filled just up to its limit. In other words, the dimensions of means for limiting the flow of the replication material (e.g., the dimensions of discontinuities or edges and of the intervening recesses and their volumes) are designed in accordance with expected values of the volume of replication material being applied.

Depending on other constraints, the volume of the recess is adjusted by selecting the depth and the width of the recess. The depth is e.g. limited by the process for creating the replication tool, and the width of the recess is limited by design constraints limiting the overall size of the optical element plus surplus material. So the overall design of the recess and drop deposition constitutes an optimal selection of the interrelated features of drop deposition precision and recess geometry, according to optimisation criteria that depend on the individual product.

In one embodiment, the replication tool includes a spacer dimensioned to stop the flow of the replication material by touching the substrate at one side of the cavity; and an overflow channel enabling the flow of the replication material towards another side of the cavity.

In one embodiment, the replication tool includes a buffer volume at at least one side of the element volume defined by the cavity, the buffer volume and the element volume defining, at their common boundary, an inner edge for inhibiting the flow of the replication material into the buffer volume.

In certain embodiments, the replication tool includes further edges in the surface of the buffer volume for inhibiting the flow of the replication material into the buffer volume. The further edges follow the shape of the inner edge at least roughly in parallel curves.

The tool can include a plurality of cavities, thus preferably allowing for the simultaneous manufacturing of an array of elements on a common substrate. This common substrate preferably is part of an opto-electronic or micro-opto-electronic assembly comprising optical and electronic elements produced on a wafer scale and later diced into separate units.

Further preferred embodiments are evident from the dependent patent claims. Features of the method claims may be combined with features of the device claims and vice versa.

The replica (for example, a micro-optical element, micro-optical element component or an optical micro-system) can be made of epoxy. The hardening step, which is done while the replication tool is still in place—can be a UV curing step. UV light curing is a fast process that allows for good control of the hardening process. The skilled person will know other materials and other hardening processes can be used.

An optical element can be an element that is capable of influencing electromagnetic radiation in, for example, the visible, infrared, or UV part of the electromagnetic spectrum. A wafer is not limited by the shape of the substrate.

Further preferred embodiments are evident from the dependent patent claims. Features of the method claims can be combined with features of the device claims and vice versa.

BRIEF DESCRIPTION OF THE DRAWINGS

The subject matter of the invention will be explained in more detail in the following text with reference to preferred exemplary embodiments, which are illustrated in the attached drawings, which schematically show.

DESCRIPTION OF THE INVENTION

Figure 1:
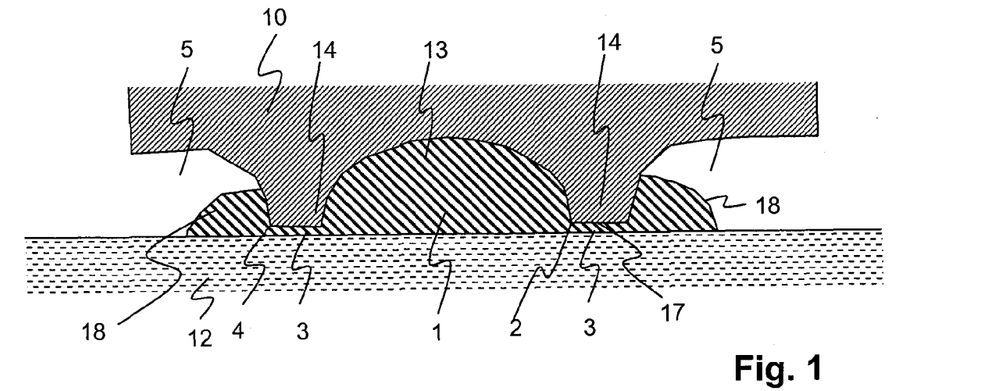
FIGS. 1 and 2: cross sections through a tools placed on a substrate.

FIG. 1 schematically shows a cross section through a tool 10 placed on a substrate 12. The tool 10 forms a cavity 8 that defines the shape of the element to be formed by an element volume 1. In the shown case, the optical element is simply a refractive lens. The element volume 1 lies between the tool 10 and the substrate 12. It is surrounded by a protruding element of the tool 10, which here is denoted as floating spacer 14. A flat surface 17 of the spacer runs approximately parallel to the surface of the substrate 12 and here is at a distance of about 5 μm to 15 μm therefrom. Underneath the floating spacer 14, between the flat surface 17 and the substrate 12, a small buffer volume 3 forms. Between the element volume 1 and the buffer volume 3, the tool 10 comprises an inner edge 2. Between the buffer volume 3 and an overflow volume 5, the tool 10 comprises an outer edge 4.

The main function of the floating spacer 14 is to pull out excess material by capillary forces. The flow stops at the outer edge 4 and forms a bulge 18, and therefore prevents that the element volume 1 is emptied by the capillary forces. In this way, the width of the floating spacer 14 and the shape and size of the overflow volume 5 define where excess material is to go. Therefore, by keeping the replication material volume below a certain maximum volume, the replication material is confined.

The inner edge 2 constitutes a first discontinuity, stopping the flow an outer boundary of the replication material 13, as is also shown in following Figures. The outer edge 4 constitutes a second discontinuity, stopping the replication material 13 from flowing to the buffer volume 5 adjacent to the buffer volume 3. Without such discontinuities, capillary forces would cause the replication material 13 to continuously flow along the channel formed by the buffer volume 3, eventually draining the replication material 13 from the element volume 1.

Figure 2:
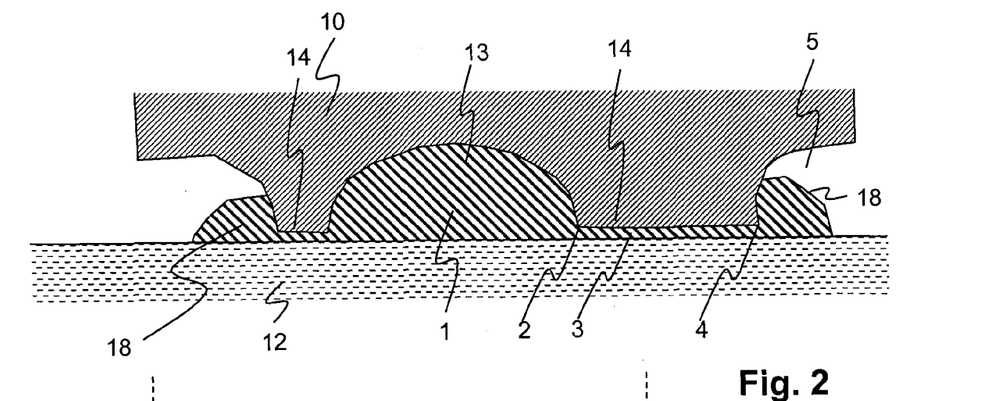
Figure 3:
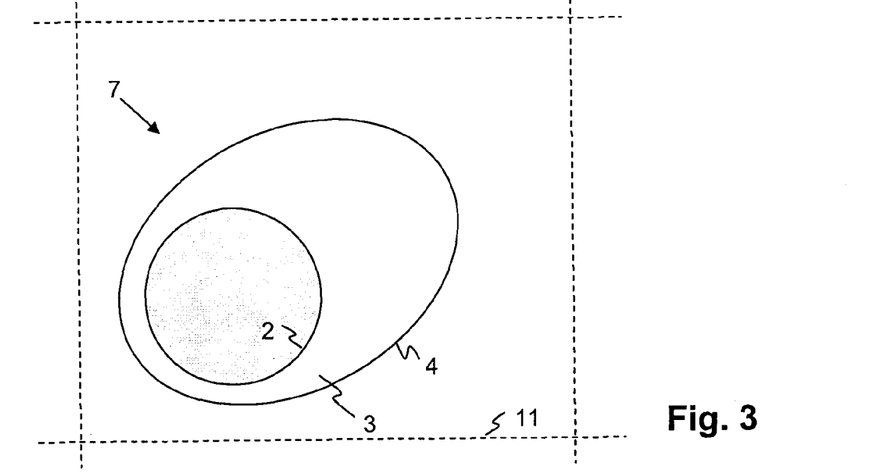
FIG. 3: an elevated view of the arrangement of FIG. 2.

FIG. 2 shows a variation of the above principle. In this variation, the floating spacer 14 surrounding the element volume 1 is asymmetric. By this, the excess material can be transported to areas where it is not disturbing other processes. A top view of the configuration of FIG. 2 is shown in FIG. 3. The bulge of replication material (shown in FIGS. 1 and 2, but not in FIG. 3, since the latter only shows the tool 10 without the replication material) extending around the outer edge 4 can, for example, be approximately constant in its cross section. By the asymmetric shape of the floating spacer, the length of the outer edge 4 is increased. For these reasons, the asymmetric solution allows to confine by the replication material especially well in one desired direction, corresponding to the lower left corner in the sketched configuration, as can be especially desired in configurations with an off-center optical element.

The tool can include multiple sections each corresponding to an element to be replicated. The sections can be arranged array-like, for instance in a grid with grid 11 lines corresponding to cutting or dicing lines for later separation of the substrate 12 carrying the manufactured optical elements or corresponding to bonding areas where other elements are later to be bonded.

Figure 4:
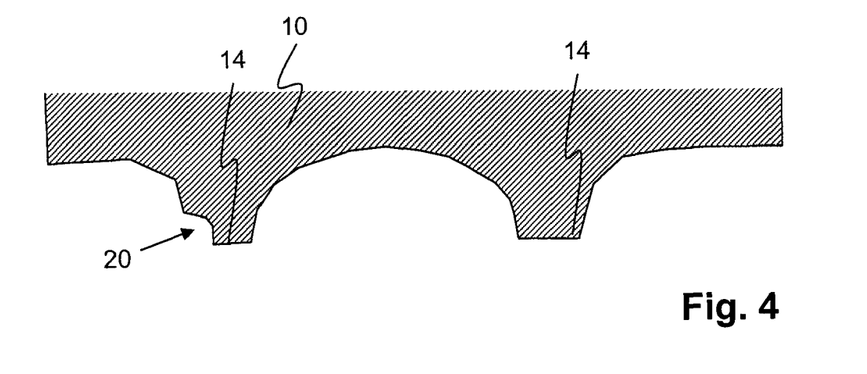
FIG. 4: an example of an alternative geometrical shape of a transition between a buffer volume and an overflow volume.

As shown in FIGS. 2 and 3, an asymmetry of material flow between different directions can be implemented. However, it is also possible to influence the replication material flow by other means such as different surface properties at different locations or by geometrical shape. The outside portions of the spacers 14 can be formed in a way so that differing surface tensions can be used to control the excess material. An example is shown in FIG. 4. The spacer 14 at one side comprises a geometrical feature 20 that causes the flow towards this side to be different from the flow towards the other side.

Figure 5:
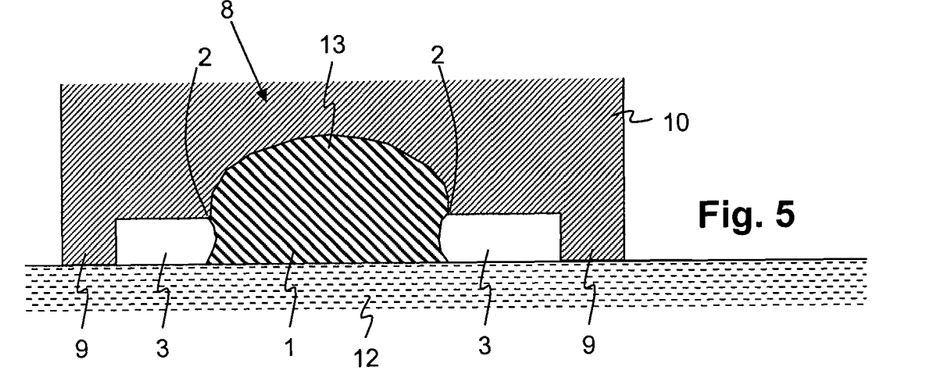
FIGS. 5-9: cross sections through further tools.

FIG. 5 shows a cross section of a tool 10 with replication material 13 just filling the element volume 1 and being contained by the discontinuity of the inner edge 2 between the element volume 1 and the buffer volume 3. The length of the buffer volume 3 preferably lies in the range of 100 to 300 or 500 or 800 micrometers.

In FIG. 5, the buffer volume 3 is within the cavity 8. Also, the z-dimension and thus the element height and ultimately the element volume are fixed by a contact spacer 9 surrounding the cavity 8. The contact spacer 9 can, for example, be of the kind described in WO 2004/068198, herein incorporated by reference in its entirety. FIG. 5 thus shows an example where the replication material is confined by a combination of an exact dispensing of the replication material volume corresponding to the element volume 1 (or to a slightly smaller or larger volume) and the effect of surface tension in combination with the impact of an edge 2.

Figure 6:
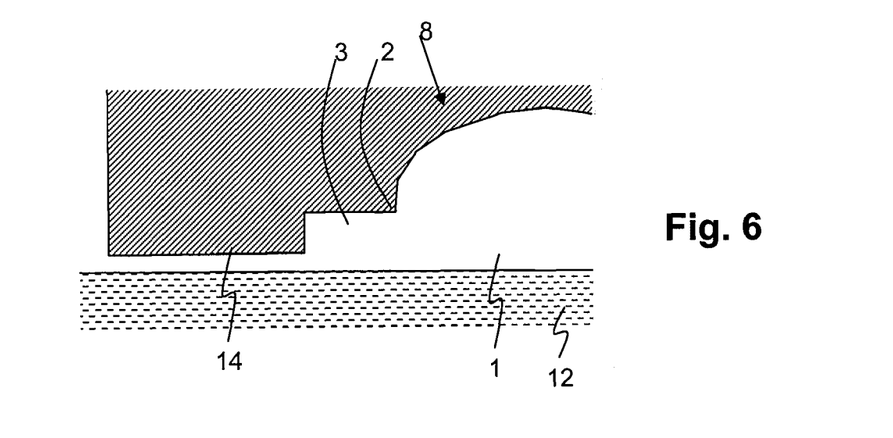

The embodiment relying on a more or less exact dispensing of the replication material and a geometrical element (such as an edge) limiting the replication material flow in at least one direction by surface tension and/or capillary forces does not rely on there being a contact spacer surrounding the cavity, although there can be. FIG. 6 shows part of a cross section of a tool 10 in which on one side, an (optional) elevated spacer section 14 is shown. In such an embodiment, the z-dimension is defined in another way, for example by contact spacers on an other side (not shown) or at an other, for example peripheral lateral position, by active distance adjusters and/or controllers, or other means.

Figure 7:
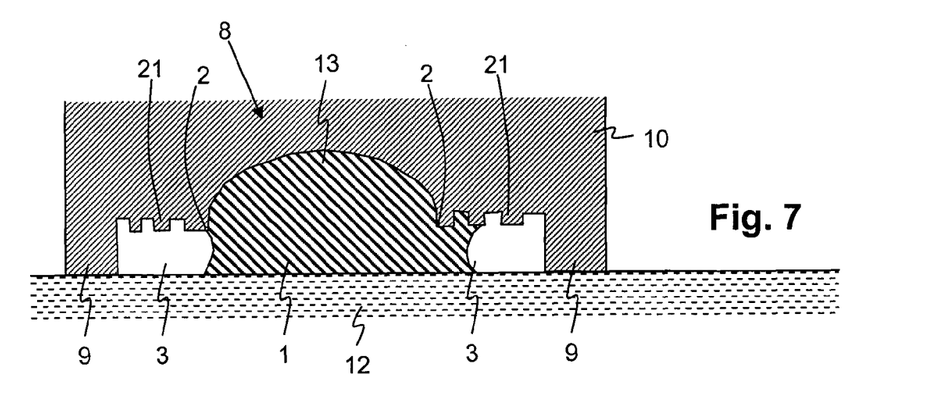

FIG. 7 shows a cross section of a tool 10 with further edges 21 formed at the surface of the buffer volume 3. These further edges 21 confine the flow of the replication material 13, and come into action depending on the total volume of the replication material 13, which can vary when applying the replication material 13 individually with a doser, such as a dosing syringe, to the cavity 8, to the substrate 12 at locations opposite to the cavities 8, or generally, if no spacers and thus no cavities are present, on the lateral positions of the elements to be replicated, either to the substrate or to the replication tool or to both.

Figure 8:
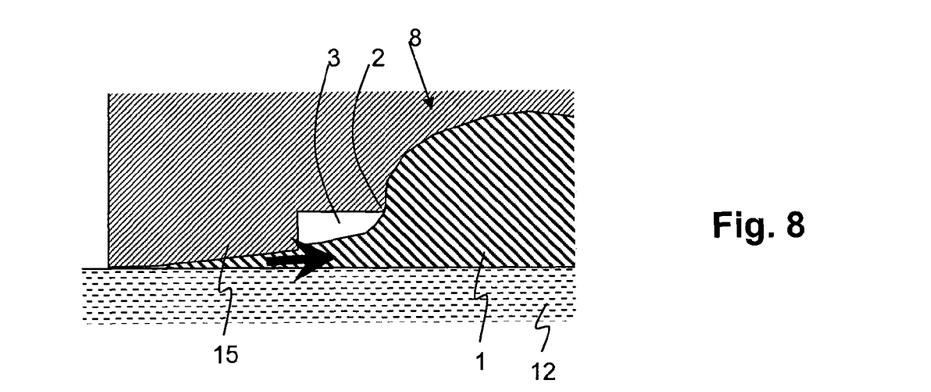

FIG. 8 shows part of a cross section of a tool 10 that has an inclined spacer 15 prior to being pressed against the substrate 12. The arrow shows the direction of flow of the replication material 13 under the inclined spacer 15, as it is being compressed. Usually, the weight of the replication tool, with optional additional weights, is sufficient to generate the required pressure. The buffer volume 3 takes up the replication material 13 displaced from under the inclined spacer 15. In this embodiment, it is the inclined spacer that limits the flow.

Figure 9:
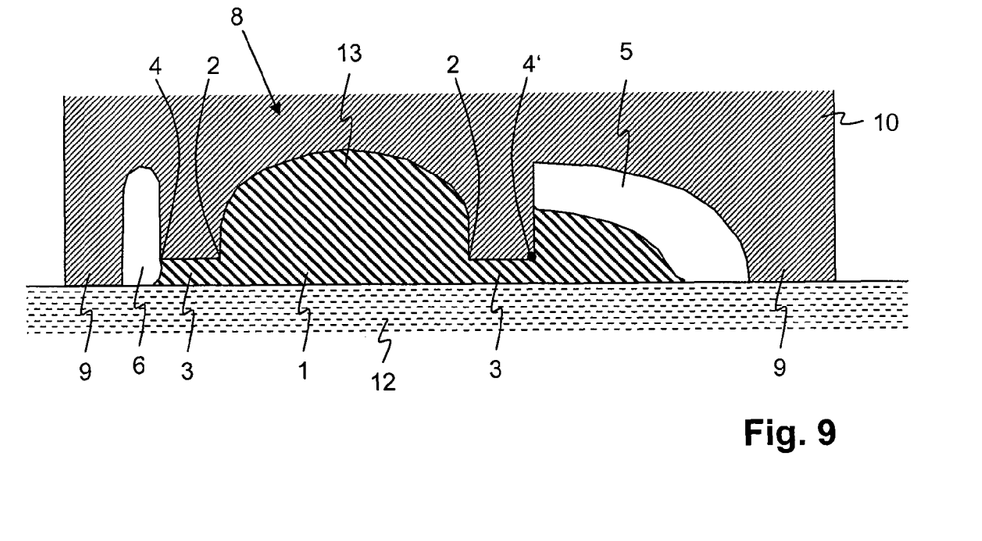
Figure 10:
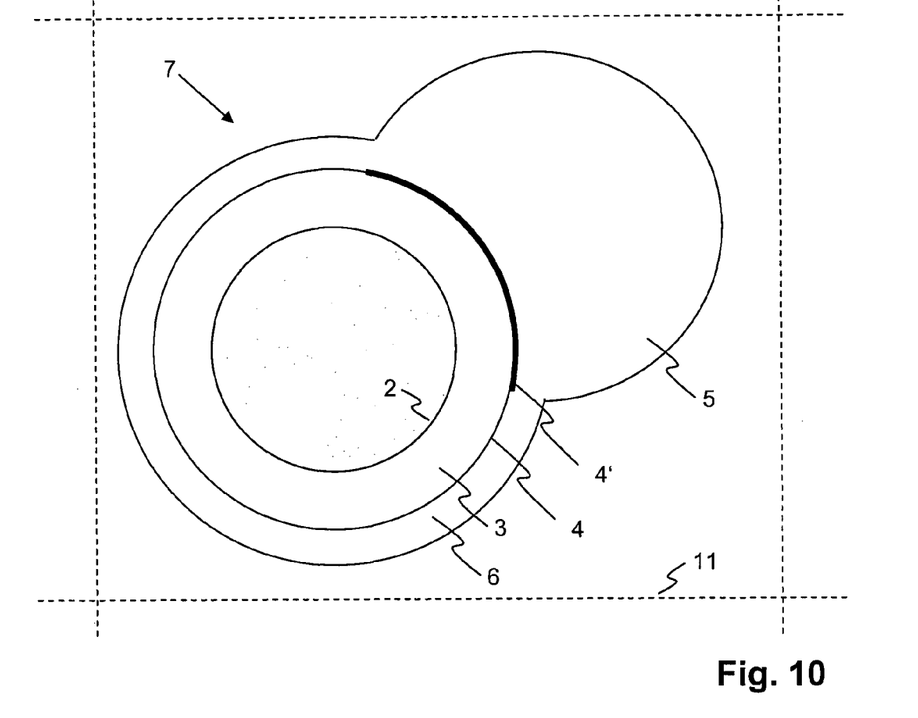
FIG. 10: an elevated view of the arrangement of FIG. 9.

FIG. 9 schematically shows a cross section through a tool 10 placed on a substrate 12. FIG. 10 shows a corresponding elevated view. The tool 10 comprises a cavity 8 that defines the shape of the element to be formed by an element volume 1. The element volume 1 lies between the tool 10 and the substrate 12, and is surrounded by a buffer volume 3. Between the element volume 1 and the buffer volume 3, the tool 10 comprises an inner edge 2. Between the buffer volume 3 and an overflow volume 5, and between the buffer volume 3 and a free volume 6, the tool 10 comprises an outer edge 4, 4'. The buffer volume 3 constitutes an outlet or overflow channel 16 for surplus material, in the case that the amount of replication material 13 exceeds the volume of the element volume 1.

For cases in which a large volume tolerance is required, the cavity 8 comprises an overflow volume 5 on one side of the element volume 1. On the other side, the outer edge 4, or the free volume 6 or the spacer 9 defines the limit of flow for the replication material 13, keeping the replication material 13 away from critical areas of the substrate. This outer edge 4, together with the outer limit of the overflow volume 5, defines a predetermined area 7 that gives the maximum area of substrate 12 that can be covered by the replication material 13.

The outer edge 4, 4' is shaped differently between the transition 4 from the buffer volume 3 to the free volume 6 on the one hand and the transition 4' from the buffer volume 3 to the overflow volume 5 on the other hand, so that surface tension and/or capillary forces cause excess replication material to flow into the overflow volume 5 but not to the free volume 6. For example, the outer edge 4, 4' can be sharper at the transition 4 to the free volume 6 and rounder at the transition 4' to the overflow volume 5.

The tool 10 here rests on (optional) contact spacers 9 placed against the substrate 12. The function of the free volume 6, which is not to be filled by replication material, is, in combination with the outer edge 4, to stop the flow of the replication material and also to thereby prevent it from flowing underneath the contact spacer 9. Depending on the viscosity of the replication material, surface tension and capillary forces, this may not be necessary, and the flow can be stopped by the contact spacer itself. In that case, the contact spacer can be immediately adjacent to the element volume 1, without there being a need for the buffer volume and the free volume 6.

Since the overflow volume 5 is higher than the buffer volume 3, following a discontinuity or step in height at the outer edge 4, capillary forces are no longer relevant. For the sake of convenience, the dimension perpendicular to the surface of the substrate 12 is denoted as height. In actual practice, the entire arrangement can also be used upside down. The overflow volume 5 can be filled in accordance with the surplus replication material volume.

In an exemplary embodiment of the invention, a diameter of the element volume 1 is between 1 and 2 millimetres and has a height around 250 micrometers, the height of the buffer volume 3, i.e. the distance between the cavity 8 and the substrate 12 in the region of the buffer volume 3 is about 10 micrometers, the length of the buffer volume 3, i.e. the distance from the inner edge 2 to the outer edge 4 is about 50 to 200 micrometers.

Figure 11:
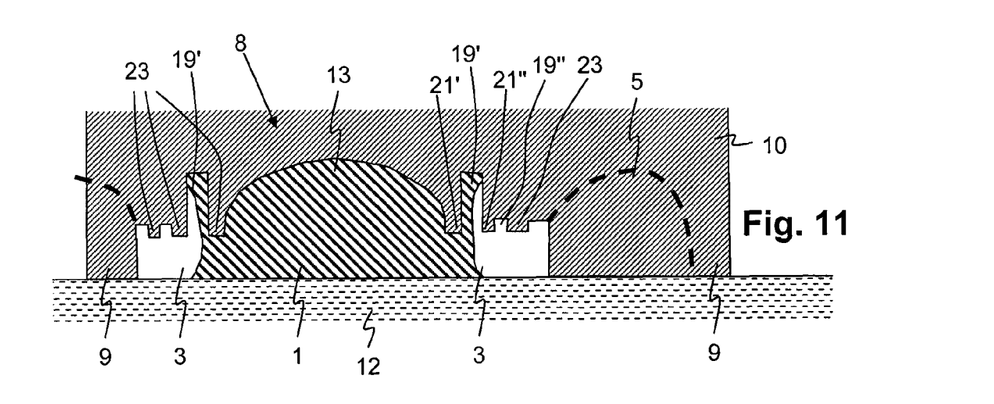
FIGS. 11-14: cross sections through further tools.
Figure 12:
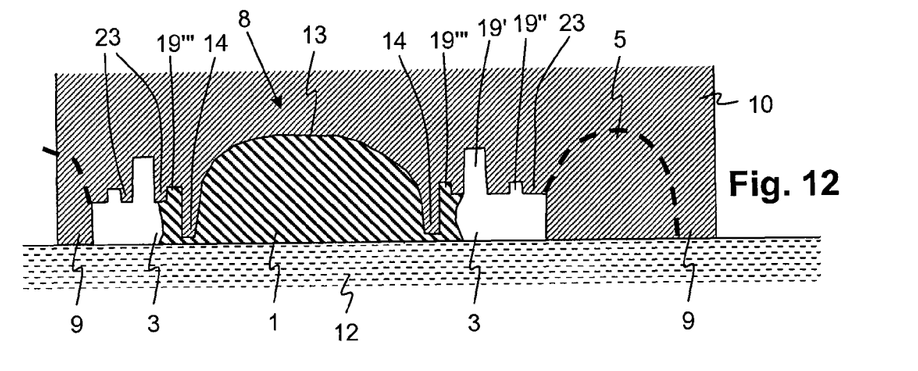
Figure 13:
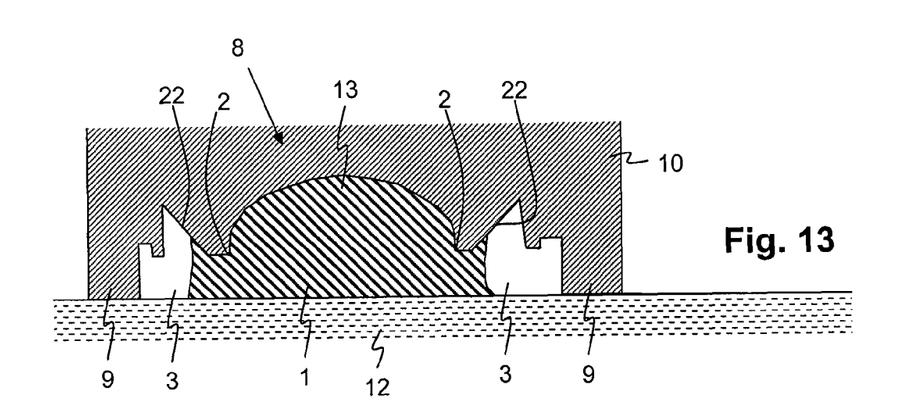

FIGS. 11 through 13 show cross sections through further tools which comprise buffer volumes with recesses adapted to the expected size or volume of individual drops of replication material. FIG. 11 shows a tool 10 similar to that of FIG. 7, e.g., without a floating spacer, in which the further edges 21 constitute the boundaries between ridges 23 and recesses 19', 19''. The ridges 23 and recesses 19', 19'', as in the other figures, run around the element volume 1, e.g., as concentric circles or following the contour of a noncircular optical element. In the latter case, the width and depth of each circumferential ridge or channel formed in this manner preferably remains constant around its circumference. In FIG. 11, a first, inner recess 19' has a larger volume, since its width and/or depth is larger than that of a second, outer recess 19''. The inner recess 19' can accept a relatively large volume of surplus replication material and is preferably located and sized such that the volume of replication material required to reach a first, inner edge 21' of the inner recess 19' corresponds to an expected minimum volume deposited by a drop deposition device (with a given probability); and the volume of replication material required to reach a second, outer edge 21'' of the inner recess 19' corresponds to an expected maximum volume deposited by a drop deposition device (with a given probability).

For cases in which the replication material exceeds the expected maximum volume (with low probability, but not to be ruled out completely), the second, outer recess 19'' can be arranged to create a limit according to its edges. This arrangement of ridges can be combined with an overflow volume 5, indicated by dashed lines, or not.

FIG. 12 shows a tool 10 with recesses 19', 19'', 19''' and ridges 23 arranged and dimensioned in an analogue fashion as in FIG. 11, but separated from the element volume 1 by a elevated (floating) spacer 14, as in FIG. 1. As a variant of the recess/ridge arrangement of FIG. 11, a further recess 19''' is arranged inside the larger recess 19', in order to account for the low probability cases in which the surplus material is less than the expected minimum volume of deposited material, and to provide for a defined contour of the replication material. Again, this arrangement of ridges can be combined with an overflow volume 5, indicated by dotted lines, or not.

FIG. 13 shows a tool 10 with an inclined or sloped surface 22 extending outwards from an elevated spacer 14 with increasing height. As a result, the relation between the distance from the element volume 1 and the volume of replication material required to fill the cavity under the inclined surface 22 up to this distance is non-linear. This nonlinearity is not only caused by the area covered increasing with the square of the radius, but further also because of the height of the sloped surface increasing with the radius. Depending on the viscosity and other flow properties (in particular adhesion vs. cohesion) of the replication material, this geometry can be of advantage. This geometry can be combined with regular or irregularly sized recesses and ridges as in FIGS. 11 and 12, and with or without an overflow volume 5. A geometry with an inclined surface can also be used in set-ups without the contact spacers 9. For example, it can be used in configurations like the one in FIG. 1 as a surface of the surplus volume 5.

Figure 14:
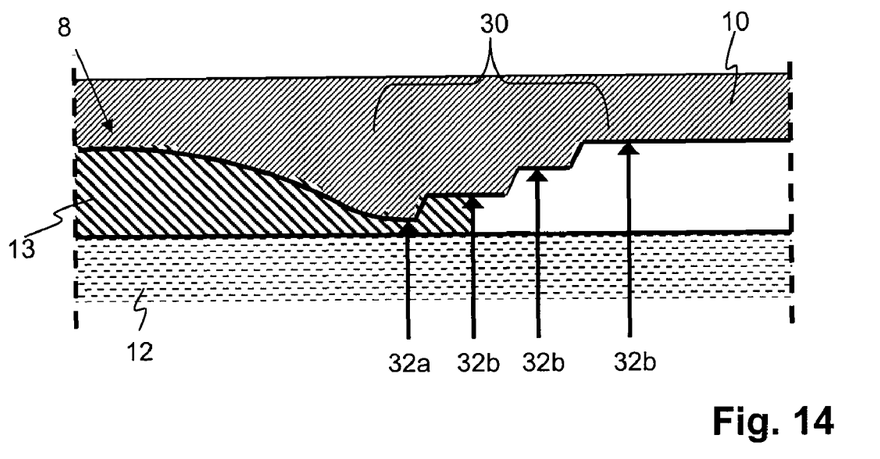

FIG. 14 shows another embodiment of a tool 10 including a peripheral feature 30 for confining the replication material 13 to a predetermined area of the substrate 12. The peripheral feature 30 is positioned adjacent the cavity 8. The peripheral feature 30 can be a stepped region defined in the tool 10. As shown in FIG. 14, the stepped region can include a plurality of step features defined in the tool 10. At least one of the step features can confine the replication material 13.

For example, the stepped region can include one or more lateral positions 32x at which the replication material is confined. A lateral position 32a can be at an edge of a step, or a lateral position 32b can be at an intermediate region of a step. The lateral positions can be determined by the thickness of the optical element being formed and the resulting distance between the tool 10 and substrate 12 after they are moved toward each other. For example, the replication tool 10 can rest on a film of replication material 13. The amount of replication material 13 can be pre-determined so that the replication tool 10 rests a predetermined distance from the substrate 12.

Figure 15:
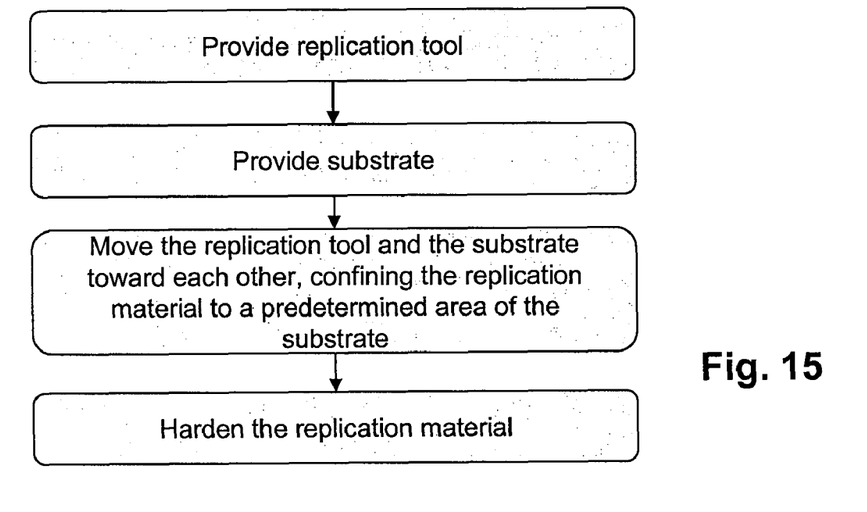
FIG. 15: a flow diagram of the method according to the invention.

FIG. 15 shows a flow diagram of the method described.

While the invention has been described in present preferred embodiments of the invention, it is distinctly understood that the invention is not limited thereto, but may be otherwise variously embodied and practised within the scope of the claims.

What is claimed is:

1. A method of manufacturing an optical element, comprising:

providing a replication tool comprising (i) a negative structural feature defined in a replication side of the replication tool, the negative structural feature defining the shape of the optical element, and (ii) a peripheral feature formed in the replication side of the replication tool adjacent the negative structural feature, the peripheral feature being an edge surrounding the negative structural feature;

disposing a predetermined volume of replication material between a substrate and the replication tool at a disposing location;

moving the replication tool and the substrate toward each other until (i) the replication material is in contact with both the substrate and the replication tool and (ii) the replication material flows outward from the disposing location;

causing the outward flow of the replication material to stop at the edge while the edge is kept at a distance from the substrate to confine the replication material to a predetermined area of the substrate, wherein the outward flow of the replication material stops at the edge based on (i) the predetermined volume of replication material dispensed and (ii) at least one of capillary forces acting at the edge of the replication tool or surface tension of the replication material, wherein the portion of the replication material contacting the replication tool does not flow beyond the edge; and hardening the replication material to form the optical element from the replication material attached to the substrate.

2. The method of claim 1 wherein the predetermined area exceeds an area of the optical element.

3. The method of claim 1 further comprising controlling the flow of the replication material, while moving the replication tool against the substrate, by both capillary forces acting at the edge of the replication tool and the surface tension of the replication material.

4. The method of claim 1 wherein the predetermined volume of the replication material is about the volume of the negative structural feature.

5. The method of claim 1 further comprising predetermining a dimension of the peripheral feature in accordance with the predetermined volume of the replication material to be applied at the disposing location.

6. The method of claim 1 wherein the replication tool includes a ridge formed in the replication tool surrounding the negative structural feature, the edge being an edge of the ridge.

7. The method of claim 1 wherein the negative structural feature is limited, at least in one lateral direction, by a flat section, an inner edge being formed between the negative structural feature and the flat section, the replication side of the replication tool further comprising at least one overflow volume, an outer edge being formed between the flat section and the overflow volume, and wherein the predetermined volume of the replication material is larger than the volume of the negative structural feature so that the outward flow of the replication material contacting the replication tool does not flow beyond the outer edge and is confined to the predetermined area of the substrate.

8. The method of claim 7 wherein the flat section is asymmetrical with respect to a central axis of the negative structural feature.

9. The method of claim 1 wherein the peripheral feature includes a plurality of step features defined in the tool, each step feature comprising an edge adapted to stop the outward flow of the replication material contacting the replication tool from flowing beyond the edge to confine the replication material to the predetermined area of the substrate.

10. The method of claim 1 wherein the replication tool defines a plurality of negative structural features, each defining the shape of one optical element of a plurality of optical elements.

11. The method of claim 1 further comprising:
   removing the replication tool after the replication material is hardened; and
   separating the substrate into discrete sections.

12. The method of claim 11 further comprising separating the substrate along dicing lines defined by lateral positions of the substrate free of any replication material.

13. The method of claim 1 wherein the predetermined volume of the replication material is larger than the volume of the negative structural feature.

* * * * *